United States Patent Office 2,900,490
Patented Aug. 18, 1959

2,900,490

COATED ELECTRODE FOR WELDING CAST IRON

Leon M. Petryck, Cranford, and George R. Pease, Westfield, N.J., assignors to The International Nickel Company, Inc., New York, N.Y., a corporation of Delaware No Drawing. Application June 24, 1958
Serial No. 744,078

17 Claims. (Cl. 219—137)

The present invention relates to a coated welding electrode and, more particularly, to a coated electrode for welding cast iron of the type containing graphite in the spheroidal form, otherwise known as ductile iron.

It is well known that ductile iron is a relatively new engineering material and may be defined as cast iron produced by using normal melting techniques but with the introduction into the iron of a small amount of magnesium, cerium, etc., either in elemental form or as an addition agent containing magnesium, cerium, etc., such as a nickel-magnesium alloy, so as to partially or completely effect a conversion of the contained graphite to the spheroidal form. Such a cast iron possesses high tensile strength and a high order of ductility comparable in many respects to the higher cost cast steels. Ductile iron has been welded successfully in a number of ways. Thus, the metal has been joined by arc welding using electrodes containing a core having a high nickel content and by the oxy-acetylene method. Among the disadvantages of such electrodes might be mentioned the limited tolerance of the resulting high-nickel weld deposit to tramp elements (such as phosphorus) and the non-matching composition of the weld deposit to the parent metal. However, the most important disadvantage is the high material cost, to such an extent that in industry such electrodes are used only for welds requiring small amounts of deposited metal or when dimensional integrity must be maintained. Where large-scale weld deposits are required, oxy-acetylene welding with iron or steel weld rods is used. Oxy-acetylene welding is slow and does not appeal to the operator. In addition, the number of trained operators available to industry for arc welding is considerably greater than the number of trained operators available for oxy-acetylene welding who are in the minority and decreasing in numbers.

Although many attempts were made to overcome the foregoing disadvantages, none, as far as we are aware, was entirely successful when carried into practice commercially on an industrial scale.

We have now discovered a coated electrode suitable for arc welding ductile iron which has a special flux coating composition.

It is an object of the present invention to provide an inexpensive electrode suitable for arc-welding ductile iron.

Another object of the invention is to provide an electrode easy to manufacture.

The invention also contemplates providing an electrode having desirable operating characteristics.

The invention further contemplates providing a special flux composition for an electrode used in welding ductile iron.

Still another object of the invention contemplates an improvement in the welding of ductile iron.

Other objects and advantages will become apparent from the following description wherein embodiments of the present electrode are described.

Broadly stated, the present invention contemplates a coated welding electrode having a commercially available steel core wire to which is bonded a highly carboniferous carbonate-fluoride, e.g., limestone-fluorspar, flux coating containing controlled amounts of carbon, silicon, and an agent from the group consisting of rare earth metals, and rare earth metal oxides, each constituent of the flux being in a special proportion with the other constituents thereof so that, together with the steel core wire, a coated arc welding electrode is obtained having good arc behavior and slagging characteristics. The special coated electrode is also capable of producing sound welds which are resistant to weld hot-cracking. The dry flux of the coating contemplated by the present invention contains the following essential ingredients in the amounts set forth (in parts by weight of the dry flux):

TABLE I

| Ingredients: | Range |
| --- | --- |
| Alkaline earth metal carbonate | 25 to 40 |
| Alkaline earth metal fluoride | 15 to 30 |
| Carbon | 15 to 30 |
| Silicon as ferro-silicon | 3 to 6 |
| Rare earth metal and/or rare earth metal oxide | 2 to 10 |

Optionally, up to 10 parts by weight of strontium carbonate can be added to the dry ingredients so that all in all a total of up to 50 parts by weight of an alkaline earth metal carbonate can be successfully employed, with the proviso that any portion exceeding 40 parts by weight of alkaline earth metal carbonate must be strontium carbonate. Advantageously, up to 6 parts by weight of clay, e.g., bentonite, can be incorporated in the flux. In order to avoid undesired side reactions of the silicon with other ingredients in the flux or binder, advantageously the silicon is added as a ferro-silicon alloy wherein the silicon content is between 25% to 60%, for example, a ferro-50-silicon, i.e., the commercial grade of ferro-silicon containing approximately 50% silicon. Silicon in this form is stabilized with regard to the remainder of the flux.

It is essential that all of the foregoing ingredients of the flux composition be present in the amounts specified in order to provide a coated electrode having the required operating characteristics, including arc stability, slagging characteristics, etc. The carbon and ferro-silicon contents in the flux coating not only contribute to the production of good electrode characteristics during welding but also insure that the weld metal produced using the electrode will have a cast iron composition. The content in the flux coating of an agent from the group consisting of rare earth metals and rare earth metal oxides, e.g., cerium and/or cerium oxide, likewise contributes to arc stability and provides an effective means for insuring transfer of the graphite spheroidizing agent from the flux coating to the pool of weld metal during welding. The agent from the group consisting of rare earth metals and rare earth metal oxides can be derived from any suitable source such as mischmetal, etc. It is advantageous to employ a rare earth metal oxide, e.g. cerium oxide, in the flux coating since in this manner additional oxygen ions are made available to the arc gap thereby contributing conductivity to the arc gap.

In carrying the invention into practice, the particular ingredients in the amount set forth in the following Table II and III (in parts by weight of dry flux) can advantageously be used as the dry flux.

TABLE II

| Preferred Ingredients | Range | Example |
| --- | --- | --- |
| Calcium Carbonate | 25–40 | 32 |
| Calcium Fluoride | 15–30 | 21 |
| Graphite | 15–30 | 25 |
| Silicon (as ferro-50-silicon) | 3–6 | 4 |
| Cerium Oxide | 2–10 | 6 |

The foregoing dry flux of the coating can also desirably contain the following additional ingredients:

TABLE III

| Ingredient | Range | Example |
| --- | --- | --- |
| Strontium Carbonate | 0–10 | 4 |
| Clay, e.g., bentonite | 0–6 | 4 |

The ingredients used in making the flux are powdered ingredients. In general, the mixed ingredients should have a particle size of between about 35 mesh and about 325 mesh (between about 0.0164 inch and about 0.0017 inch diameter).

A water dispersible, e.g., soluble, binder is used with the flux composition to provide a durable and hard coating on the steel core after drying and baking. This binder advantageously is a silicate type binder. Optionally, up to 4 parts of invert sugar can be added. For convenience, a proprietary invert sugar solution containing about 82% of solids in water, i.e., a water solution of about 43° Baumé, such as "Mordex," may be used. However, other types of invert sugar solutions are satisfactory. The following Table IV gives the amounts (in parts by weight of the dry flux) of ingredients which can be used for the binder. It is to be noted, however, that ingredients of a different specific gravity than shown herein also can be used.

TABLE IV
*Binder for electrode*

| Ingredient | Range | Example |
| --- | --- | --- |
| Sodium Silicate (47.6° Baumé) | 10–20 | About 15. |
| Invert Sugar (43° Baumé, preferably "Mordex") | 0–4 | About 2½. |
| Water | (¹) | About 5. |

¹ As needed for extrudability, usually about 2 to 10.

The flux coating can be applied to the core wire in any suitable manner, e.g., by an extrusion process, and dried on the wire surface by suitable drying and/or baking. This results in a hard adherent coating of high mechanical strength relatively free from impairment under normal handling conditions. A satisfactory drying or baking treatment of the flux and binder mixture comprises a normal continuous oven drying treatment followed by a baking treatment for about two hours at about 610° F.

Commercially available steel wire can be used as the core wire for the electrode. For example, the core wire may consist of any steel having matrix microstructural components associated with alpha iron, e.g., ferrite, pearlite, etc., and containing about 0.08% to 0.35% carbon, up to 0.9% manganese, minor amounts of the impurities sulfur and phosphorus, and the balance essentially iron. A mild steel core wire containing 0.5% manganese, 0.15% carbon, 0.034% sulfur, 0.006% phosphorus and the balance essentially iron is very satisfactory.

The combinations of core wire diameters and coated electrode outside diameters set forth in Table V have been suitable.

TABLE V

| Wire, diameter in inch | Coated Electrode, O.D., in inch |
| --- | --- |
| 0.125 | about 0.180 to 0.270. |
| 0.156 | about 0.210 to 0.300. |
| 0.187 | about 0.240 to 0.330. |
| 0.250 | about 0.290 to 0.390. |

The heat treatment required depends somewhat on the type of workpieces to be welded and the properties desired in the weld metal and weldments. Generally, a preheat in the range of about 1200° F. to about 1600° F. is needed and a preheat at about 1300° F. is usually adequate. The need for a preheat treatment, e.g., at 1300° F., is lessened, however, when weld joints having relatively little restraint are made. This, in turn, depends largely on the joint design. Thus, deposits have been successfully welded with a preheat of about 1200° F. To obtain a typical ductile iron weld structure, the weldments are subjected to a post heat treatment, e.g., annealing, ferritizing, etc. Thus, the post heat treatment may consist in heating the weldment at about 1500° F. to about 1750° F. for at least about 1 hour, e.g., about 2 to 5 hours depending upon the thickness of the weldment section, followed by slow cooling as in a furnace. When ferrite is desired rather than pearlite, the welds are slowly cooled from the high heating temperature to a temperature of about 1275° F. and are held at this temperature for at least about 2 hours and up to about 5 hours, after which they may be cooled in air. The weld has a ductile iron structure containing about 3.0% to about 4.2% carbon (preferably 3.4% to 3.8%), about 1.5% to about 3.5% silicon (preferably 1.8% to 2.5%) and the balance essentially iron.

For the purpose of giving those skilled in the art a better understanding of the invention, the following illustrative examples are given of the type of welds which have been successfully made by using the electrode of the present invention.

EXAMPLES

A commercially purchased mild steel 5/32" (0.156 inch) diameter wire was used as the core. The wire was analyzed and found to contain about 0.5% manganese, 0.15% carbon, 0.034% sulfur and 0.006% phosphorus and the balance iron.

A flux consisting of about 32 parts by weight of calcium carbonate, about 25 parts of carbon as graphite, about 21 parts of calcium fluoride, about 4 parts of silicon as ferro-50-silicon (e.g., about 8 parts ferro-50-silicon), about 6 parts cerium oxide and about 4 parts strontium carbonate was applied to the foregoing wire using a binder consisting of about 15 parts by weight of the flux of sodium silicate (47.6° Baumé), about 2½ parts "Mordex" and about 5 parts water. The electrode was dried in an oven by heating it slowly to a temperature of about 600° F. and holding at that temperature for about 2 hours. The outside diameter of the coated electrode was about 0.250 inch.

The workpieces were made of ductile iron castings of the following composition: total carbon 3.6%, silicon 2.5%, manganese 0.4%, phosphorus 0.05% and magnesium 0.05%. The workpieces consisted of four 6 inch x 8 inch x 2 inch U grooved blocks containing a milled gouge about 1" deep x 1" wide x 3" long in one of the 6" x 8" faces. Two of the blocks were preheated at about 1300° F. (Welds No. 1 and No. 2). The other two blocks (Welds No. 3 and No. 4) were preheated at 1500° F. Successful welds were made on all blocks by successively depositing weld beads in the groove at 135 amperes and 28 volts. A total of about 16 weld beads were required to completely fill the groove. Welds No. 1 and No. 3 were then given a post heat treatment at about 1650° F. for about two hours, cooled in a furnace to about 1275° F., held for about 5 hours, then cooled in air. Welds No. 2 and No. 4 did not receive a post heat treatment. The results of the above treatment are tabulated in Table VI.

TABLE VI

| Weld No. | Ultimate Strength, p.s.i. | Percent elongation, in 2 inches |
| --- | --- | --- |
| 1 | 57,500 | 2.5 |
| 2 | 61,250 | 0.0 |
| 3 | 61,275 | 6.0 |
| 4 | 73,750 | 0.0 |

In another example, the flux composition was varied so as to consist of about 32 parts by weight of calcium carbonate, about 30 parts of graphite, about 27 parts of calcium fluoride, about 5 parts silicon as ferro-50-silicon (e.g., about 10 parts of ferro-50-silicon), about 8 parts of cerium oxide and about 5 parts of strontium carbonate. The flux was applied to the same core wire with the same binder as in the previous examples. The workpiece consisted of a 6 inch x 3 inch x ½ inch ductile iron plate preheated to 1200° F. The weld deposit consisted of 8 layers, one weld bead in width. The weld was satisfactory.

In addition to the coated electrodes hereinabove described, other electrodes having the flux coatings shown in Table VII also were tested and found satisfactory.

TABLE VII

Parts by weight of the dry flux

| Coated Electrode Outside Diameter, Inches | CaCO3 | CaF2 | SrCO3 | C | Silicon as Fe-50-Si | CeO |
| --- | --- | --- | --- | --- | --- | --- |
| 0.270 | 32 | 27 | 5 | 30 | 5 | 8 |
| 0.250 | 33 | 21 | 4 | 20 | 6 | 6 |
| 0.250 | 34 | 22 | 4 | 20 | 5 | 6 |
| 0.250 | 35 | 23 | 4 | 20 | 4 | 6 |
| 0.250 | 30 | 19 | 4 | 25 | 6 | 6 |
| 0.250 | 31 | 20 | 4 | 25 | 5 | 6 |
| 0.250 | 28 | 16 | 4 | 30 | 6 | 6 |
| 0.250 | 29 | 17 | 4 | 30 | 5 | 6 |
| 0.250 | 30 | 18 | 4 | 30 | 4 | 6 |
| 0.250 | 31 | 20 | 4 | 25 | 5 | 6 |

All the weldments obtained by using electrodes having a flux herein described were free of gas pores and other defects. As the resultant structure was mostly carbidic after welding, an annealing or post heat treatment was required if ductility or machinability was desired.

The coated welding electrode provided by the present invention is particularly applicable to welding ductile iron, although ordinary types of cast iron also may be welded therewith. The invention has the advantage that an electrode having a commercially available steel core wire can be used, provided that the special flux composition described herein is employed as a coating thereon.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A coated arc welding electrode adapted for joining workpieces of cast iron comprising the combination of a steel core wire made of a steel containing about 0.08% to 0.35% carbon, up to about 0.9% manganese and the balance essentially iron, and a flux coating therearound which contains by weight about 25 to about 50 parts of alkaline earth metal carbonate with the proviso that any portion exceeding 40 parts by weight must be strontium carbonate, about 15 to about 30 parts of alkaline earth metal fluoride, at least about 15 parts and up to 30 parts of carbon, about 3 to about 6 parts of silicon introduced as a ferrosilicon alloy, at least about 2 parts and up to about 10 parts of an agent selected from the group consisting of rare earth metals and rare earth metal oxides, and a binder.

2. A flux coating composition for an arc welding electrode comprising by weight about 25 to about 50 parts of an alkaline earth metal carbonate with the proviso that any portion exceeding about 40 parts by weight must be strontium carbonate, about 15 to about 30 parts of alkaline earth metal fluoride, at least about 15 parts and up to about 30 parts of carbon, about 3 to about 6 parts of silicon introduced as a ferrosilicon alloy, and at least about 2 parts and up to about 10 parts of an agent from the group consisting of rare earth metals and rare earth metal oxides.

3. A flux coating composition for an arc welding electrode comprising from about 25 to about 40 parts by weight of the flux of an alkaline earth metal carbonate selected from the group consisting of calcium carbonate, strontium carbonate, barium carbonate, and mixtures thereof, from about 15 to about 30 parts of an alkaline earth metal fluoride selected from the group consisting of calcium fluoride, barium fluoride, strontium fluoride and mixtures thereof, at least about 15 parts and up to about 30 parts of carbon, from about 3 to about 6 parts of silicon in the form of ferrosilicon, and at least about 2 parts and up to about 10 parts of cerium oxide.

4. A flux coating composition for an arc welding electrode comprising from 25 to about 40 parts by weight of the flux of calcium carbonate, from about 15 to about 30 parts of calcium fluoride, at least about 15 parts and up to about 30 parts of carbon, from about 3 to about 6 parts of silicon in the form of ferro-50-silicon, and at least about 2 parts and up to about 10 parts of cerium oxide.

5. A flux coating composition as claimed in claim 4 wherein the carbon is in the form of graphite.

6. A flux coating composition as claimed in claim 4 containing up to about 10 parts by weight of strontium carbonate.

7. A flux coating composition as claimed in claim 4 containing up to about 6 parts by weight of clay.

8. A flux coating composition for an arc welding electrode comprising by weight about 28 to about 35 parts of calcium carbonate, about 16 to about 27 parts of calcium fluoride, about 4 to about 5 parts of strontium carbonate, about 20 to about 30 parts of graphite, about 4 to about 6 parts of silicon in the form of ferro-50-silicon, and about 6 to about 8 parts of cerium oxide.

9. A flux coating composition for an arc welding electrode comprising by weight about 32 parts of calcium carbonate, about 21 parts of calcium fluoride, about 4 parts of strontium carbonate, about 25 parts of graphite, about 4 parts of silicon in the form of ferro-50-silicon and about 6 parts of cerium oxide.

10. A method of welding a ductile iron workpiece comprising the steps of providing a welding flux containing in parts by weight of the flux, about 25 to about 40 parts of an alkaline earth metal carbonate selected from the group consisting of calcium carbonate, strontium carbonate, barium carbonate, and mixtures thereof, from about 15 to about 30 parts of an alkaline earth metal fluoride selected from the group consisting of calcium fluoride, barium fluoride, strontium fluoride and mixtures thereof, at least 15 parts and up to 30 parts of carbon, from about 3 to about 6 parts of silicon introduced as a ferrosilicon, at least 2 parts and up to 10 parts of an agent from the group consisting of rare earth metals and rare earth metal oxides; binding the flux to a steel core to form a coated electrode; preheating a ductile iron workpiece to about 1200° F. to about 1600° F.; arc welding said workpiece with said coated electrode to form a weldment; postheating the weld to between about 1500° F. to about 1750° F. for at least about 1 hour; and thereafter slowly cooling said weld.

11. The method claimed in claim 10 wherein the weld is subjected to a ferritizing post heat treatment comprising the steps of slowly cooling the heated weld to a temperature of about 1275° F., holding the weld at this temperature for at least about 2 hours and then cooling the weld in air.

12. A method of welding a ductile iron workpiece comprising the steps of providing a welding flux containing, in parts by weight of the flux, about 25 to about 40 parts of calcium carbonate, from about 15 to about 30 parts of calcium fluoride, at least about 15 parts and up to about 30 parts of graphite, from about 3 to about 6 parts of silicon introduced as a ferro-50-silicon, at least about 2 parts and up to about 10 parts of rare earth metal oxides; binding this flux to a mild steel core to form a coated electrode; preheating a ductile iron workpiece to between about 1200° F. to about 1600° F.; arc welding said workpiece with said coated electrode to form a weld; postheating the weld to between about 1500° F. to about 1750° F. for about 2 to about 5 hours; and thereafter slowly cooling said weld.

13. The method claimed in claim 12 wherein the weldment is subjected to a ferritizing postheat treatment comprising the steps of slowly cooling the heated weldment in a furnace to a temperature of about 1275° F., holding the weldment at this temperature for at least about 2 hours and then cooling the weldment in air.

14. A coated arc welding electrode comprising the combination of a mild steel core having a flux coating therearound, said flux coating having the composition set forth in claim 3.

15. A coated arc welding electrode comprising the combination of a mild steel core having a flux coating therearound, said flux coating having the composition set forth in claim 4.

16. A coated arc welding electrode comprising the combination of a mild steel core having a flux coating therearound, said flux coating having the composition set forth in claim 8.

17. A method of welding a cast iron workpiece comprising the steps by providing a welding flux containing, in parts by weight of the flux, about 25 to about 40 parts of calcium carbonate, from about 15 to about 30 parts of calcium fluoride, at least about 15 parts and up to about 30 parts of graphite, from about 3 to about 6 parts of silicon introduced as a ferro-50-silicon, at least about 2 parts and up to about 10 parts of rare earth metal oxides; binding this flux to a mild steel core to form a coated electrode; preheating a cast iron workpiece to between about 1200° F. to about 1600° F.; arc welding said workpiece with said coated electrode to form a weld; postheating the weld to between about 1500° F. to about 1750° F. for about 2 to about 5 hours; and thereafter slowly cooling said weld.

References Cited in the file of this patent
UNITED STATES PATENTS

| | | |
|---|---|---|
| 2,113,222 | Rochocz | Apr. 5, 1938 |
| 2,213,390 | Franklin | Sept. 3, 1940 |
| 2,323,711 | Franklin | July 6, 1943 |
| 2,520,806 | Kihlgren | Aug. 29, 1950 |
| 2,626,339 | Wasserman | Jan. 20, 1953 |
| 2,817,751 | Phillips | Dec. 24, 1957 |